US006751314B1

(12) United States Patent
Benesty et al.

(10) Patent No.: US 6,751,314 B1
(45) Date of Patent: Jun. 15, 2004

(54) DYNAMIC ALLOCATION OF RESOURCES FOR ECHO CANCELLATION

(75) Inventors: Jacob Benesty, Summit, NJ (US); Tomas Fritz Gaensler, Chatham, NJ (US); Steven Leslie Gay, Long Valley, NJ (US); Man Mohan Sondhi, Mountain Lakes, NJ (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/431,847

(22) Filed: Nov. 2, 1999

(51) Int. Cl.[7] .............................................. H04M 1/00
(52) U.S. Cl. .............................. 379/406.04; 379/406.08
(58) Field of Search ....................... 379/406.07, 406.09, 379/406.04, 406.01, 406.08

(56) References Cited

U.S. PATENT DOCUMENTS

| 5,343,522 A | * | 8/1994 | Yatrou et al. | 379/406.09 |
| 5,631,900 A | * | 5/1997 | McCaslin et al. | 379/406.08 |
| 5,940,455 A | * | 8/1999 | Ikeda | 379/406.08 |
| 5,951,626 A | * | 9/1999 | Duttweiler | 708/322 |

OTHER PUBLICATIONS

Steven L. Gay, "An Efficient, Fast Converging Adaptive Filter for Network Echo Cancellation," in Conference Record of the Thirty–Second Asilomar Conference on Signals, Systems & C omputers (Michael B. Matthews ed., 1998).
S. Ikeda and A. Sugiyama, "A Fast Convergence Algorithm for Sparse—Tap Adaptive FIR Filters for an Unknown Number of Multiple Echoes" IEEE pp III–41–44 (1994).
K. Bullington and J. M. Fraser "Engineering aspects of TASI," Bell System Tech. J., pp. 353–364 (1959).
S. Kawamura and M. Hatori, "A tap selection algorithm for adaptive filters," IEEE proc. of ICASSP, pp. 2979–2982 (1986).
V. Madisetti, D. Messerschmitt, and N. Nordstrom, "Dynamically reduced complexity implementation of echo cancelers," IEEE proc. of ICASSP, pp. 1313–1316 (1986).
J. Homer et al., "Quantifying the Effects of Dimension on the Convegence Rate of the LMS Adaptive FIR Estimator," in IEEE Transactions on Signal Processing vol. 46, No. 10 (1998).
ITU–T Recommendation G. 168 "Transmission Systems and Media, Digital Systems and Networks—Digital Network Echo Cancellers" Section 3.4 (Apr. 1997).

* cited by examiner

Primary Examiner—Minsun Oh Harvey
Assistant Examiner—Jefferey Harold
(74) Attorney, Agent, or Firm—Harness, Dickey & Pierce, P.L.C.

(57) ABSTRACT

A method is presented for dynamic resource allocation in a speech signal echo canceler enabling more efficient echo cancellation and as a result the ability for an Integrated Circuit to handle additional channels than heretofore possible. This is accomplished by applying one or more of three efficiency enhancing strategies. First, no update of coefficients is computed or convolution performed if the power level of the far end speech signal is below a given threshold. Second, convolution is limited to the set of active taps (i.e., taps that account for most of the power in the echo). Third, new coefficients are computed only when the power of the error signal is greater than a given threshold. Lastly, the set of active coefficients is periodically updated. These strategies release computational resources from unnecessary computations and divert them to other channels that may be active.

7 Claims, 2 Drawing Sheets

DYNAMIC ALLOCATION OF RESOURCES FOR ECHO CANCELLATION

FIELD OF INVENTION

The invention relates generally to improved methods of echo cancellation. Specifically, the invention improves upon the efficiency of echo cancellation by providing a dynamic allocation of echo cancellation resources, thus allowing for increased capacity of multi-channel echo canceler integrated circuits (ICs).

BACKGROUND OF THE INVENTION

Referring to FIG. 1, a prior art network, such as a telephone network is shown wherein an echo y(n) is generated when a far end signal x(n) crosses a hybrid local loop telephone termination 100. The path through termination 100 will hereinafter be referred to as the echo path, and its impulse response will be referred to as the echo path impulse response. 'n' is used herein to refer to the index of the samples of the signal.

Methods of echo cancellation in networks are well known. Generally, an echo canceler device 300 receives signal x(n) as an input and computes an estimate $\hat{y}(n)$ of the echo, y(n). In general, the estimate $\hat{y}(n)$ at time instant n is determined by multiplying the current and past L-1 samples by L filter coefficients, respectively. The output from the echo canceler 300 is input to an adder 200 which outputs the difference between the estimated echo $\hat{y}(n)$ and the signal s(n) which consists of the echo y(n) together with the near end signal, v(n), and the near end background noise, w(n).

When the coefficients correspond to those of the impulse response of the true echo path, the echo is canceled. However, the echo path is initially unknown and in addition may change over time. Therefore the filter coefficients are iteratively adjusted to adapt to the echo path's current response. To this end, the output of the adder 200 is fed back to the processor running the adaptive algorithms 375. In each sample period, new coefficients are computed, resulting in a new estimate of the echo path impulse response.

The DTD (an abbreviation for Double Talk Detector) shown in block 400, detects when both the far and near end speech are present simultaneously. In this event, the signal y(n) is not strictly the echo of x(n) but rather the combination of the echo, a near end speech signal and some noise. In this event, new coefficients should not be computed for filter 350 since they would be wrong. DTD 400 detects the double talk condition and instructs the echo canceler to continue to compute an estimate of the echo but not to adapt the coefficients.

The estimate of the echo, $\hat{y}(n)$, is generally derived as follows: Assume a sampling rate of 8 kHz and an echo path impulse response of duration 64 ms. Then the number of coefficients, L, that must be adapted, is 512. Echo canceler device 300 comprises a processor executing a filter 350 and an adaptive algorithm 375. The aim of the adaptation algorithms is to make the coefficients of the filter 350 equal to the corresponding coefficients of the actual impulse response of the echo path. Filter 350 performs a convolution of x(n) with the estimated impulse response by multiplying each filter coefficient with its corresponding sample of the far end signal, x(n) (the current sample x(n) and the previous L-1 samples), and adding all the L products. The result is the echo estimate $\hat{y}(n)$.

As currently designed, adaptive echo cancelers compute new coefficients and an echo estimate $\hat{y}(n)$ at each sampling instant. Currently, network echo canceler integrated circuits (ICs) are designed to process, for example, 32 channels. Thus, in the above example, the echo canceler IC must update 512 coefficients and perform a 512 tap convolution for each of the 32 channels every 1/8000 of a second, or 125 $\mu$s. It is desirable to increase the efficiency of echo cancelers such that an IC can handle a larger number of channels.

SUMMARY OF THE INVENTION

The subject invention provides a new echo cancellation method for voice signals which increases the computational efficiency of present-day echo cancelers such that a single echo canceler IC can handle a larger number of voice channels. This is accomplished by determining the active taps of the impulse response (i.e., those taps that have coefficients with significant magnitudes) and updating the filter coefficients only for the active taps and only when the short term power of the error signal e(n), which is the difference between the estimated echo and the actual echo, is greater than a predetermined threshold. If the error is below the predetermined threshold the filter continues to perform a convolution with the active taps using previously determined coefficients. Furthermore, additional efficiency for line echo cancelers is realized by advantageously performing the coefficient updates and convolution in only those intervals where the short time power of x(n) is above a specified threshold.

DETAILED DESCRIPTION OF THE INVENTION

The present invention seeks to enhance the ability of an echo canceler to handle increasing number of channels by efficiently allocating computational resources. Primary applicability of the method of the present invention will be to echo canceler ICs handling a large number of channels (for example several hundred), but not for single-channel cancelers. In accordance with the present invention, the per channel computational load of an echo canceler is reduced by applying one or more of the following strategies.

First, in contrast to many existing echo cancelers, much of the computation is eliminated during time intervals when there is no far end speech. This strategy is particularly relevant to line echo cancelers, such as those employed in the telephone network. In such applications, any particular channel is active, on average, only about fifty percent (50%) of the time. Thus approximately fifty percent (50%) of the computational load of a canceler IC is reduced by limiting the computations to only those channels that are active at any time. Furthermore, even during periods of otherwise active speech, there are pauses between words and sentences. One can determine if a channel is idle or active by monitoring the short term estimate of the power of x(n). When this estimate is below a specified threshold, not only is it unnecessary to update the coefficients, it is not even necessary to compute an estimate of the echo signal since there is no significant echo that needs to be cancelled. The threshold is particular to a given network, and those skilled in the art will know how to determine the threshold indicative of whether a channel is active or idle.

A second strategy employed by the present invention is to limit the adaptation process to only the active taps of the echo impulse response. The active taps are the most significant taps of the echo impulse response, the determination of which is described below. While the impulse response of a typical echo path has a duration of about 64 ms, which corresponds to 512 taps, the number of active taps is generally between 50 and 100. The method of the present invention periodically identifies the set of active taps and adapts only those. Also, it performs the convolution with just the active taps.

The third strategy employed by the present invention is not to adapt the filter coefficients when the short time power in the error signal is below a specified threshold.

Figure 1:
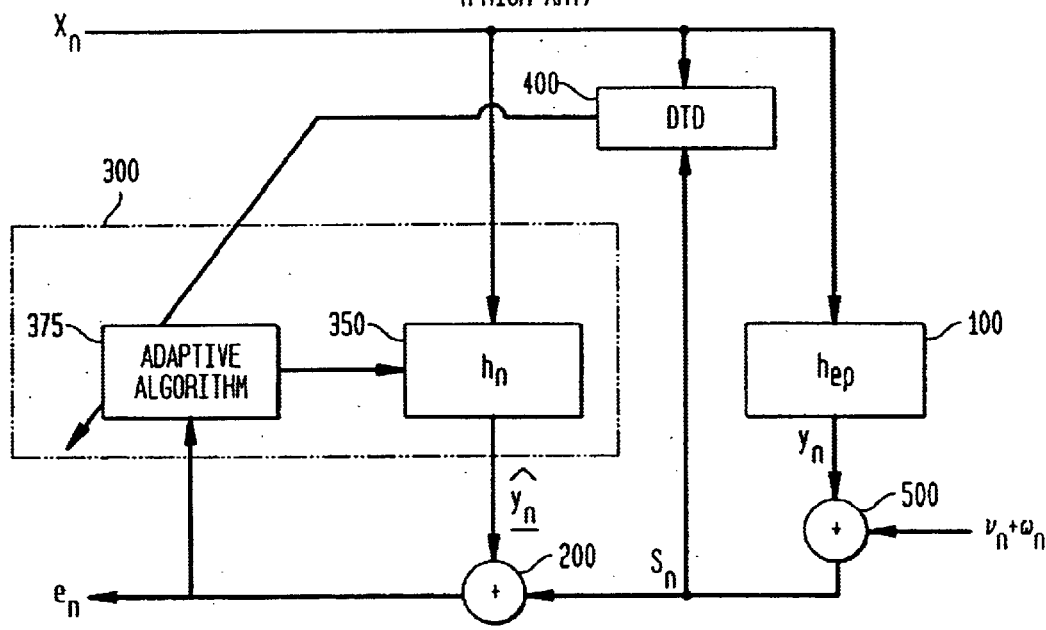
FIG. 1 illustrates a generic voice network with a line echo canceler.
Figure 2:
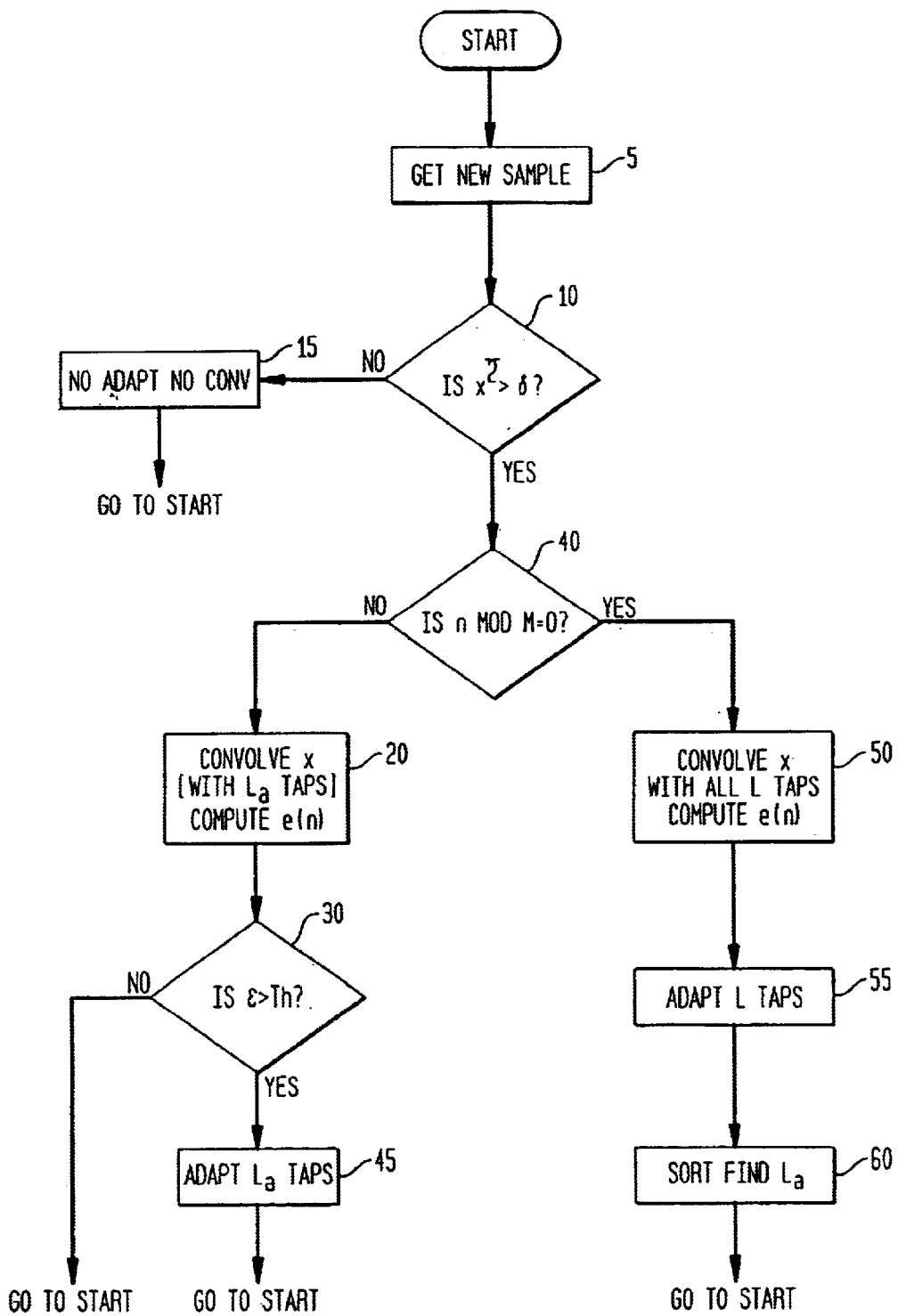
FIG. 2 is a flow chart of the algorithm for one embodiment of the present invention.

Referring to FIG. 2, a flow chart is shown illustrating one embodiment of the present invention employing all three of the foregoing strategies. Starting at a particular time instant, a sample of the far end speech x(n) is taken, as shown in block 5. An initial determination is made, as shown in block 10 as to whether the short time estimate of the power of the far end signal x(n) is greater than a given threshold 8. As explained above, there is no need to update the coefficients or to compute the estimate of the echo if the far end signal x(n) is very small. Accordingly, and as shown in block 15, if the estimated short term power of x(n) is below 8, no computations are made, and the process starts over in the next sample period.

If the far end signal is significantly large so as to indicate the transmission of speech, then a determination is made in decision block 40 as to whether or not the current sample n is divisible by M as a whole integer. The determination step of block 40 is performed so as to adapt all of the coefficients, not merely those corresponding to the active taps, once every M sample periods. For all other time instants, only the active taps are adapted. The active taps are initially identified as all of the L taps. However, as described below, over time the set of active taps is narrowed to a much smaller sub-set of the L taps.

It should be noted that as M increases in value, the complexity of the method of the present invention as shown in FIG. 2, decreases. On the other hand, with larger M, the ability to quickly respond to echo path changes is degraded. Typically, a value M=10 has been found to be a good compromise between these two opposing tendencies.

If it is determined that n is divisible by M, then an error signal e(n), which is the difference between the echo y(n) and the estimated echo ŷ(n), is computed using all L taps of the impulse response, as shown in block 50. Thereafter, as shown in block 55, the coefficients corresponding to all of the L taps are adapted and updated. Any of several known algorithms may be used for this adaptation. Due to the efficiency enhancing steps used in accordance with the present invention, the simple, well known NLMS algorithm may be used advantageously to adapt new coefficients. More complex algorithms, which are otherwise desirable, are not necessary.

After updating the L coefficients, a new set of active taps is identified. While different approaches to determine the active taps may be identified, in one advantageous method, the active taps are identified, as shown in block 60, by sorting all L coefficients in descending order of absolute value. The active set is then defined as the first $L_a$ coefficients whose cumulative magnitude just exceeds the cumulative magnitude of all L coefficients multiplied by a threshold T. The threshold T is set to a value in the range between 0.9 and 1. From here the process starts over in the next sample period with all computations based on what has now been determined as the active set of coefficients. The active set is unchanged for M-1 sample periods, although the values of the coefficients in this set may be updated as specified below.

Returning to the decision block 40, if n is not divisible by M, then an error signal e(n), which is the difference between the echo y(n) and the estimated echo ŷ(n), is computed using the active taps of the impulse response, as shown in block 20. In block 30 a third determination is made as to whether a certain decision function $\epsilon(n)$, which is a function of the error e(n), is greater than a given threshold. A good choice for this decision function is the normalized mean squared error defined as $\epsilon(n)=10 \log [(<e^2(n)>)/(<y^2(n)>+\alpha)]$, where $\alpha$ is a regularization parameter that prevents division by zero during silences between words. In this equation $<e^2(n)>$ is the average of $e^2(k)$ over all sample indices from n-N+1 to n, and $<y^2(n)>$ is the average of $y^2(k)$ over the same sample indices. The averaging window N should be chosen small enough so as to be able to track changes in the echo path adequately, yet long enough to get a stable estimate of power. Generally, this is approximately 100 ms. At each n, $\epsilon(n)$ is compared to a specified threshold, Th. The error is determined to be too small if $\epsilon(n)$ is less than Th. In such case, no adaptation is done. The threshold Th is typically set between −30 and −40 dB, a value that is several dB above the typical average power of the circuit noise.

If, on the other hand, the error is determined to be large enough (i.e., $\epsilon(n)$ is greater than Th), the active taps are updated, as shown in block 45. As in the case of block 55, the well known NLMS adaptive algorithm may be advantageously employed in this step.

It should be noted that the foregoing was described in connection with only one of the channels handled by the echo canceler IC. In practice the entire process must be repeated for each of the channels.

It is possible for an echo canceler to temporarily run out of resources. This can be attended to by foregoing coefficient updates on some of the active channels, or by increasing Th.

The foregoing merely illustrates the principles of the present invention. Those skilled in the art will be able to devise various modifications, which although not explicitly described or shown herein, embody the principles of the invention and are thus within its spirit and scope.

What is claimed is:

1. An improved method for canceling an echo of a far end speech signal, comprising the steps of:

periodically sampling said far end speech signal;

at sampling instant n=0 and thereafter at sampling instants n mod M=0, where M is a predetermined number of samples, determining L multiplying coefficients corresponding to the entire duration of the echo path impulse response;

performing a convolution of the far end sampled speech signal over the L coefficients, resulting in an estimate of said echo, calculating the error, if any, between said echo and said estimate of said echo;

adapting said L coefficients to reduce any error between said echo and said estimate of said echo, and determining from said L coefficients a set of $L_a$ coefficients corresponding to the active region of said echo impulse response, wherein $L_a<L$;

at each sampling instant n≠0 and n mod M≠0, performing a convolution of the far end speech signal over the $L_a$ coefficients, resulting in an estimate of said echo;

calculating the error, if any, between said echo and said estimate of said echo; and adapting said $L_a$ coefficients to reduce any error between said echo impulse response and said estimate of said echo impulse response only if the magnitude of said error is greater than a given error threshold.

2. The method of claim 1 wherein said error magnitude is estimated in units of dB to be $10 \log [(<e^2(n)>)/(<y^2(n)>+\alpha)]$ where $e(n)$ is the difference between said echo at n and said estimate of said echo at n and $<e^2(n)>$ equals the sum of $e^2(k)$ over all k from n-N+1 to n, $y(n)$ is the echo at n and $<y^2(n)>$ equals the sum of $y^2(k)$ over all k from n-N+1 to n, $\alpha$ is a regularization parameter set at a value so as to prevent division by zero during a moment of silence during said speech signal and N represents an averaging window whose value is small enough to track changes in the echo path, yet long enough to get a stable estimate of power.

3. The method of claim 2 wherein N corresponds to 100 ms.

4. The method of claim 2 wherein said error threshold is set between −30 and −40 dB.

5. The method of claim 1 further comprising the steps of:

determining the short time estimate of the power of said far end speech signal; and restricting said steps for adapting said L and $L_a$ coefficients and performing said convolution to sampled speech signals whose short time power is greater than a given signal threshold.

6. The method of claim 1 wherein said step of determining from said L coefficients, a set of $L_a$ coefficients, further comprises the steps of:

sorting said L coefficients in descending order of absolute value; and selecting from said L coefficients the first $L_a$ coefficients whose cumulative magnitude just exceeds the cumulative magnitude of all L coefficients multiplied by T, where T is selected between 0.9 and 1.0.

7. An improved multi-channel echo canceller for canceling an echo of a far end speech signal, comprising:

a sampler for periodically sampling said far end speech signal;

computer implemented software means for determining whether said sampled speech signal has a power level greater than a given signal threshold;

a clock means for determining whether the sampling instant n=0 or n mod M=0, where M is a predetermined number of samples and for triggering, computer implemented software for determining L multiplying coefficients corresponding to the entire impulse response duration of said echo, a filter for performing a convolution of the far end sampled speech signal over the L coefficients, resulting in an estimate of said echo, processor means for calculating the error, if any, between said echo and said estimate of said echo;

computer implemented software means for adapting said L coefficients to reduce any error between said echo and said estimate of said echo, and computer implemented software means for determining from said L coefficients a set of $L_a$ coefficients corresponding to the active region of said echo impulse response duration, wherein $L_a$ <L;

said clock means for triggering at each sampling instant n≠0 and n mod M≠0, said filter for performing a convolution of the far end sampled speech signal over the $L_a$ coefficients, resulting in an estimate of said echo;

processor means for calculating the error, if any, between said echo and said estimate of said echo; and computer implemented software means for adapting said $L_a$ coefficients to reduce any error between said echo impulse response and said estimate of said echo impulse response only if the magnitude of said error is greater than a given error threshold.

* * * * *